(12) United States Patent
Shimoyama et al.

(10) Patent No.: US 8,853,579 B2
(45) Date of Patent: Oct. 7, 2014

(54) BEARING MECHANISM FOR COMPACT ROTARY MEMBER

(75) Inventors: Eijiro Shimoyama, Saitama (JP); Shinichi Sato, Saitama (JP); Noriyoshi Machida, Kounosu (JP)

(73) Assignees: Fuji Electric FA Components & Systems Co., Ltd., Tokyo (JP); Chichibu Fuji Co., Ltd., Chichibu-Gun, Saitama (JP)

( * ) Notice: Subject to any disclaimer, the term of this patent is extended or adjusted under 35 U.S.C. 154(b) by 0 days.

(21) Appl. No.: 13/978,473

(22) PCT Filed: Apr. 26, 2012

(86) PCT No.: PCT/JP2012/061224
§ 371 (c)(1),
(2), (4) Date: Jul. 19, 2013

(87) PCT Pub. No.: WO2012/172873
PCT Pub. Date: Dec. 20, 2012

(65) Prior Publication Data
US 2013/0301962 A1    Nov. 14, 2013

(30) Foreign Application Priority Data

Jun. 17, 2011  (JP) .................. 2011-135429

(51) Int. Cl.
| H01H 3/04 | (2006.01) |
| F16C 35/00 | (2006.01) |
| F16C 35/02 | (2006.01) |
| H01H 13/14 | (2006.01) |
| H01H 3/46 | (2006.01) |
| H01H 3/32 | (2006.01) |

(52) U.S. Cl.
CPC ............... *F16C 35/02* (2013.01); *H01H 13/14* (2013.01); *H01H 2003/326* (2013.01); *H01H 3/46* (2013.01)
USPC ........................................ 200/335; 384/416

(58) Field of Classification Search
USPC ..... 200/335, 336, 339, 315, 4, 6 A, 6 R, 553; 384/129, 416
See application file for complete search history.

(56) References Cited

U.S. PATENT DOCUMENTS

2010/0116634 A1*  5/2010 Majewski et al. ............. 200/335

FOREIGN PATENT DOCUMENTS

| JP | H01-137026 U | 9/1989 |
| JP | 2001-035302 A | 2/2001 |
| JP | 2003-303527 A | 10/2003 |
| JP | 2007-115703 A | 5/2007 |
| JP | 2008-027843 A | 2/2008 |
| JP | 3159672 U | 4/2010 |
| JP | 2010-232157 A | 10/2010 |

* cited by examiner

*Primary Examiner* — Phillip A Johnson
(74) *Attorney, Agent, or Firm* — Manabu Kanesaka (57) ABSTRACT

A bearing mechanism has a rotary member made of a resin, having a cylindrical bearing integrally formed thereof and protruding from a side surface of the rotary member; a base member made of a resin and rotatably supporting the rotary member, the base member having a support shaft protruding from a position facing the cylindrical bearing of the rotary member; and an urging member constantly urging the rotary member in a predetermined direction. The cylindrical bearing of the rotary member has a bearing hole to fit and insert the support shaft of the base member.

5 Claims, 8 Drawing Sheets

BEARING MECHANISM FOR COMPACT ROTARY MEMBER

RELATED APPLICATIONS

The present application is National Phase of International Application No. PCT/JP2012/061224 filed Apr. 26, 2012, and claims priority from Japanese Application No. 2011-135429filed Jun. 17, 2011.

TECHNICAL FIELD

The present invention relates to a bearing mechanism for rotatably supporting a compact rotary member such as a rotary lever used in a safety mechanism or the like of a push button switch.

BACKGROUND ART

Figure 6:
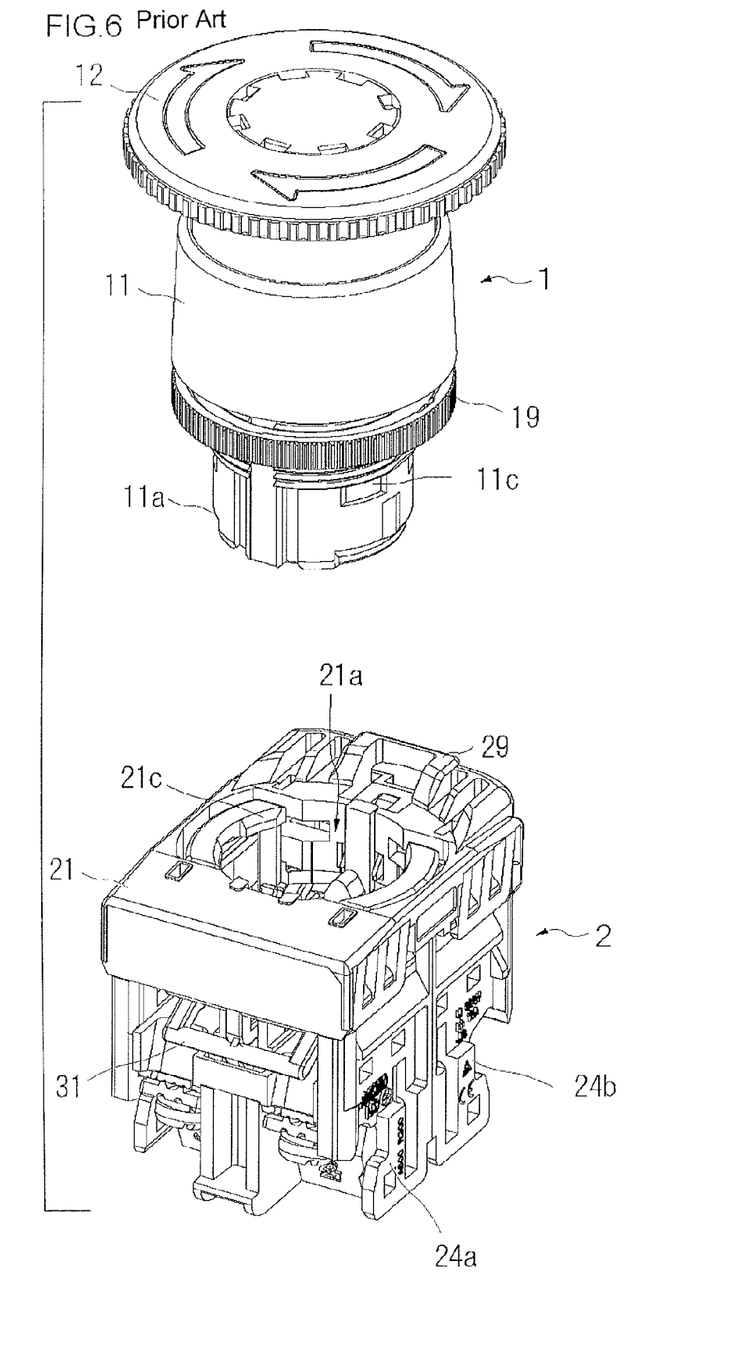
FIG. 6 is an exploded configuration diagram showing a conventional example of a push button switch to which the present invention is applied.

A push button switch of Patent Document 1 in which an operating part and a switch part are configured to be able to separate from each other is used as a switch for commanding especially a machine tool to stop in an emergency. As shown in FIG. 6, such a push button switch is configured by a switch operating part 1 and a switch part 2 attached to the operating part 1 in such a manner as to be separable therefrom, and is attached to a panel such as a control board for use.

Procedures for attaching the push button switch to a panel are described hereinafter.

The operating part 1, from which the switch part 2 is removed, has a body 11 inserted from the front side of the panel to a mounting hole thereof, and then a fixing nut 19 is screwed from the back side of the panel into the inserted body 11 of the operating part 1 and tightened, thereby fixing the operating part 1 to the panel. A fitting hole 21a of the switch part 2 is fitted to the body 11 of the operating part 1 attached to the panel, to couple and join the switch part 2 to the operating part 1.

In some cases, the push button switch that is attached to a control board or the like as described above might get involved in an accident in which the switch part 2 falls off of the operating part 1 for some reason while the push button switch is in use. When the switch part 2 is removed from the operating part 1 during a push operation of the push button switch, the pressed state of the switch part 2 accomplished by a push stick of the operating part 1 is canceled, and consequently a movable frame that retains a movable contact of the switch part 2 is returned to its return position by a return spring, returning a normally open contact unit to an OFF state and a normally closed contact unit to an ON state.

In a case in which the normally closed contact unit is in use in order to issue an emergency stop instruction, the occurrence of such accident where the switch part falls off from the operating part returns the normally closed contact unit to its ON state and thereby cancels the emergency stop instruction. As a result, the operation of the equipment that has stopped for an emergency might be resumed, causing a serious accident.

Figure 7:
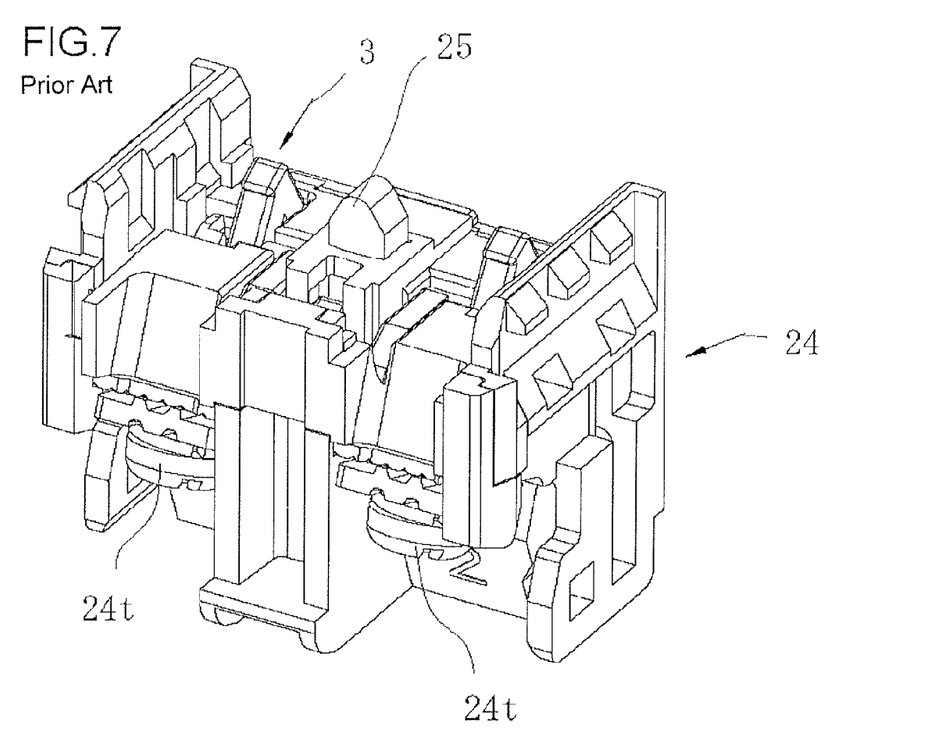
FIG. 7 is a perspective view showing a configuration of an open/close contact unit used in the conventional push button switch.
Figure 8:
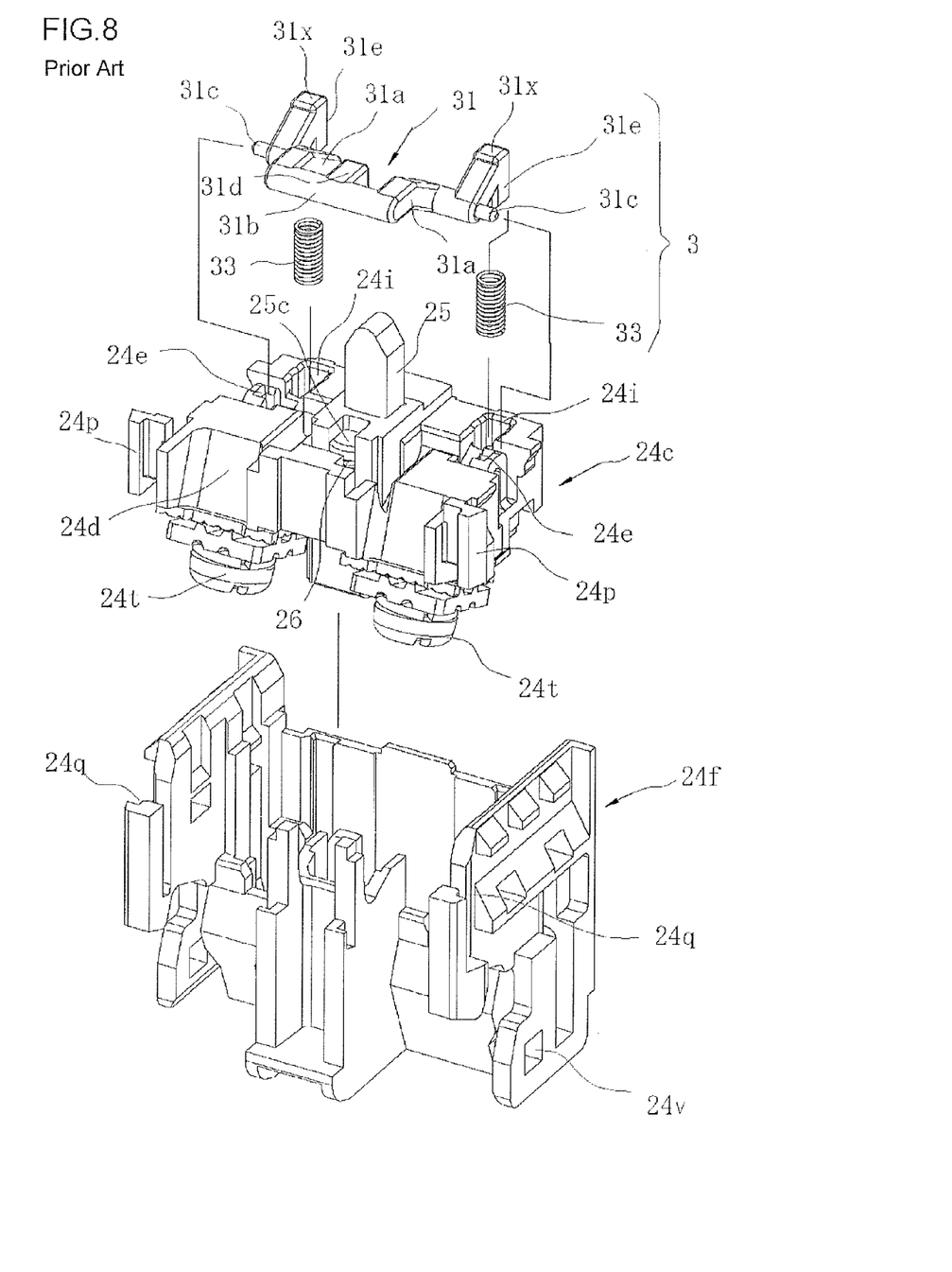
FIG. 8 is an exploded perspective view of the open/close contact unit shown in FIG. 7.

In order to avoid such danger, a released movable contact of an open/close contact unit having a normally closed contact configuration needs to be prevented from returning to a closed state along with a fixed contact when the switch part 2 of the push button switch is removed from the operating part 1, the open/close contact being used especially as an open/close contact unit for issuing an emergency stop instruction. Therefore, the push button switch described in Patent Document 1 is provided with, as shown in FIGS. 7 and 8, a contact releasing mechanism 3, which is configured by a small lever 31 that has one end supported rotatably in the switch part 2 of the push button switch and acting on a part of the operating part 1 joined to the switch part 2 and has the other end acting on a movable frame 25 of an open/close contact unit of the switch part 2 to open/close the contacts, and a spring 33 for urging the lever 31 in a certain rotational direction, an open/close contact mechanism 24c, and a unit frame 24f. When the switch part 2 is separated from the operating part 1 by the contact releasing mechanism 3, the movable frame 25 of the open/close contact unit 24 is urged so as to move a movable contact from a standby state position to an operating state position, and when the switch part is joined to the operating part the urging operation of the contact unit performed on the movable frame 25 is canceled.

The small lever 31 used in the contact separating mechanism of the push button switch and the open/close contact mechanism (base member) 24c of the switch part 2 that rotatably supports the small lever 31, are made of resin. In order to rotatably support the lever 31 on the open/close contact mechanism 24c, a columnar support shaft 31c is formed in a protruding manner on an outer surface of the lever 31, and a bearing groove or a hole 24e is provided in the open/close contact mechanism 24c. The support shaft 31c of the lever 31 is fitted into the bearing groove or hole 24e of the open/close contact mechanism 24c.

Patent Document 1: Japanese Patent Application Publication No. 2010-232157

DISCLOSURE OF THE INVENTION

When the bearing mechanism for rotatably supporting the small resin lever with the resin base member has a configuration in which a columnar support shaft is formed in the turning-side lever and a bearing groove or a hole is provided in the fixed-side base member in order to fit and insert the support shaft into the bearing groove or the hole, rotating the lever a number of times causes wear debris in the bearing section as a result of wear occurring in this section due to friction between the bearing and the lever. As a result, the coefficient of friction between the shaft and the bearing increases, causing the rotary motion of the lever unstable.

In order to stabilize the rotary of the lever, the spring force of the spring urging the lever may be increased to increase a load applied to the lever. However, an increase in the load applied to the lever worsens the wear that occurs in the shaft or the bearing supporting the shaft, due to the rotary motion of the lever. This eventually reduces the life of the rotary lever.

An object of the present invention is to solve such problems to provide a bearing mechanism for a compact lever that is capable of performing rotary motion of the lever stably for a long period of time.

In order to achieve this object, the present invention provides a bearing mechanism rotatably supporting a compact rotary lever with a base member made of a resin. The rotary lever is made of a resin and constantly urged in a predetermined direction by a spring. A cylindrical bearing is integrally formed on the small rotary lever and protruding from a side surface of the small rotary lever. The base member is formed with a support shaft protruding from a position facing the bearing of the lever so as to be fitted and inserted into a bearing hole of the bearing. The support shaft of the base member is inserted into the bearing hole of the bearing of the rotary lever so that the rotary lever is rotatably supported by the base member.

According to the present invention, the small rotary lever can be made of a highly rigid resin, and the base member can be made of a highly elastic resin.

Moreover, according to this present invention, it is best to use a polyphenylenesulfide resin as the highly rigid resin for configuring the small rotary lever and to use a polyamide resin as the highly elastic resin for configuring the base member.

The Effect of the Invention

According to the present invention, the rotary lever is rotatably supported by the base member by integrally forming the cylindrical bearing to protrude from the side surface of the small rotary lever, forming the support shaft, which is protruding from the base member in the position facing the bearing of the rotary lever, the support shaft being configured so as to be fitted and inserted into the bearing hole of the bearing, and fitting the support shaft of the base member into the bearing hole of the bearing of the rotary lever. The present invention was able to experimentally confirm that the lever could be supported stably at a low friction coefficient for a long period of time, even when the lever was rotated a number of times. It can be expected that the outer diameter of the bearing can be made large by forming the cylindrical bearing to protrude from the small rotary lever, thereby increasing the rigidity of the bearing and reducing the degree of elastic deformation caused by the rotary motion of the lever.

BEST MODE FOR CARRYING OUT THE INVENTION

An embodiment of the present invention is described hereinafter based on examples shown in the diagrams.

Figure 1:
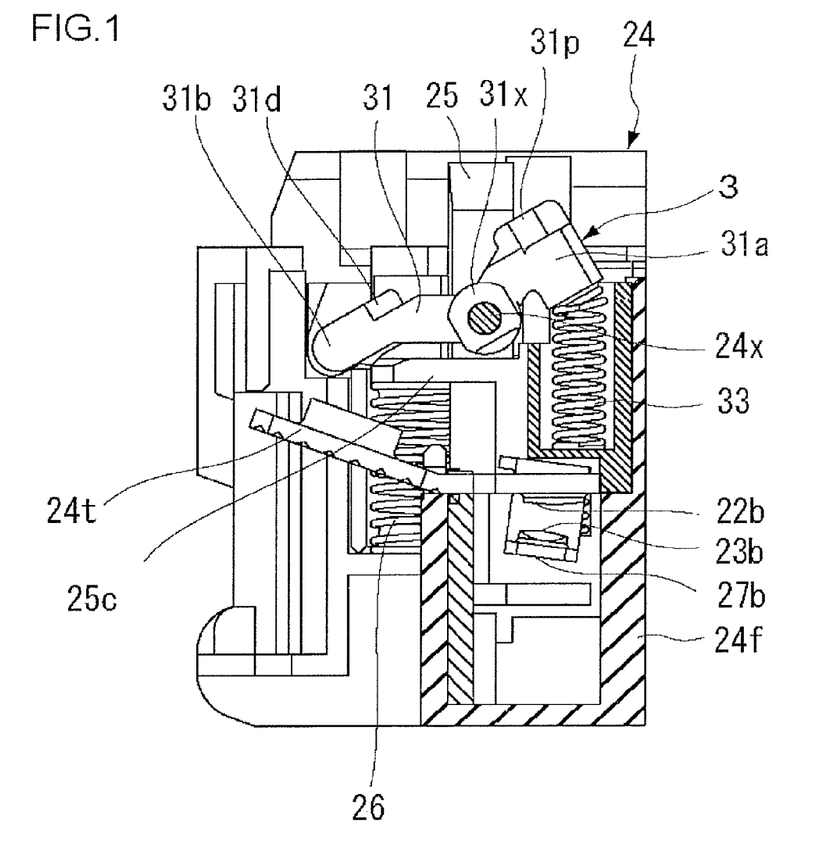
FIG. 1 is a longitudinal cross-sectional diagram showing an embodiment of an open/close contact unit of a push button switch to which the present invention is applied.
Figure 2:
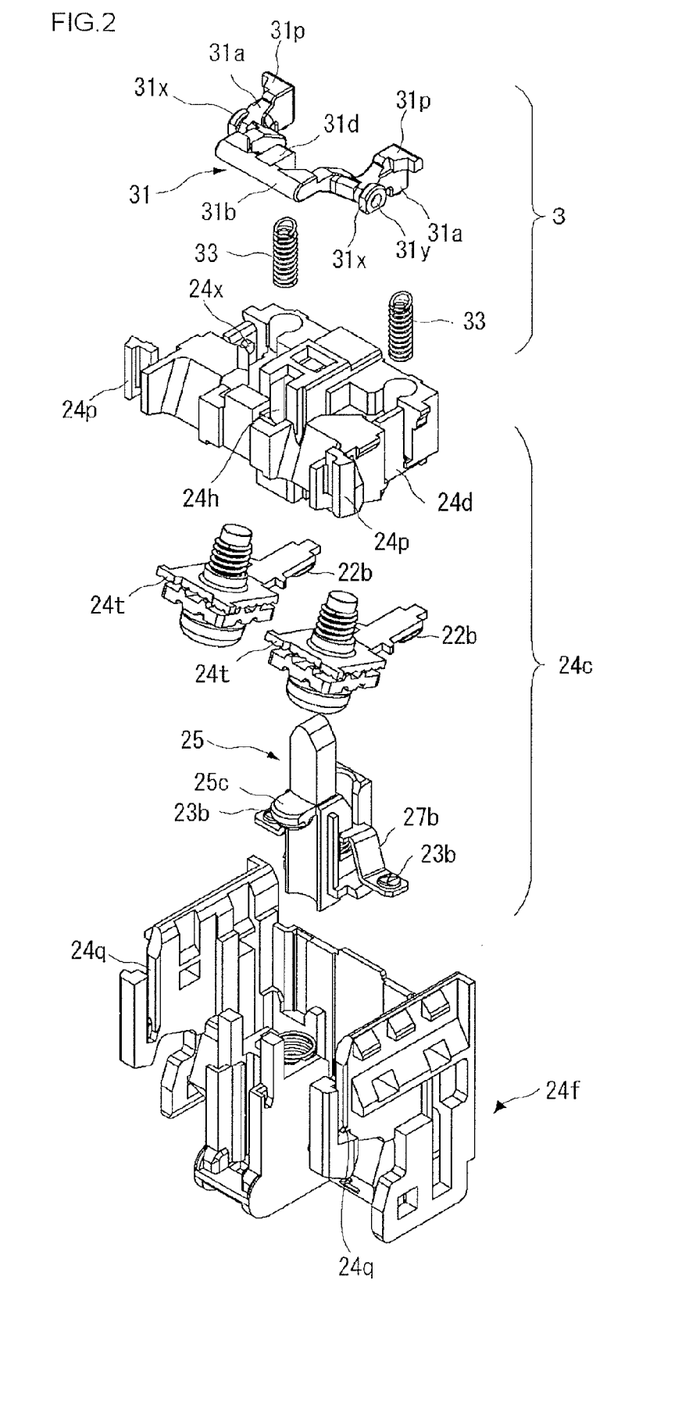
FIG. 2 is an exploded perspective view of the open/close contact unit shown in FIG. 1.
Figure 3:
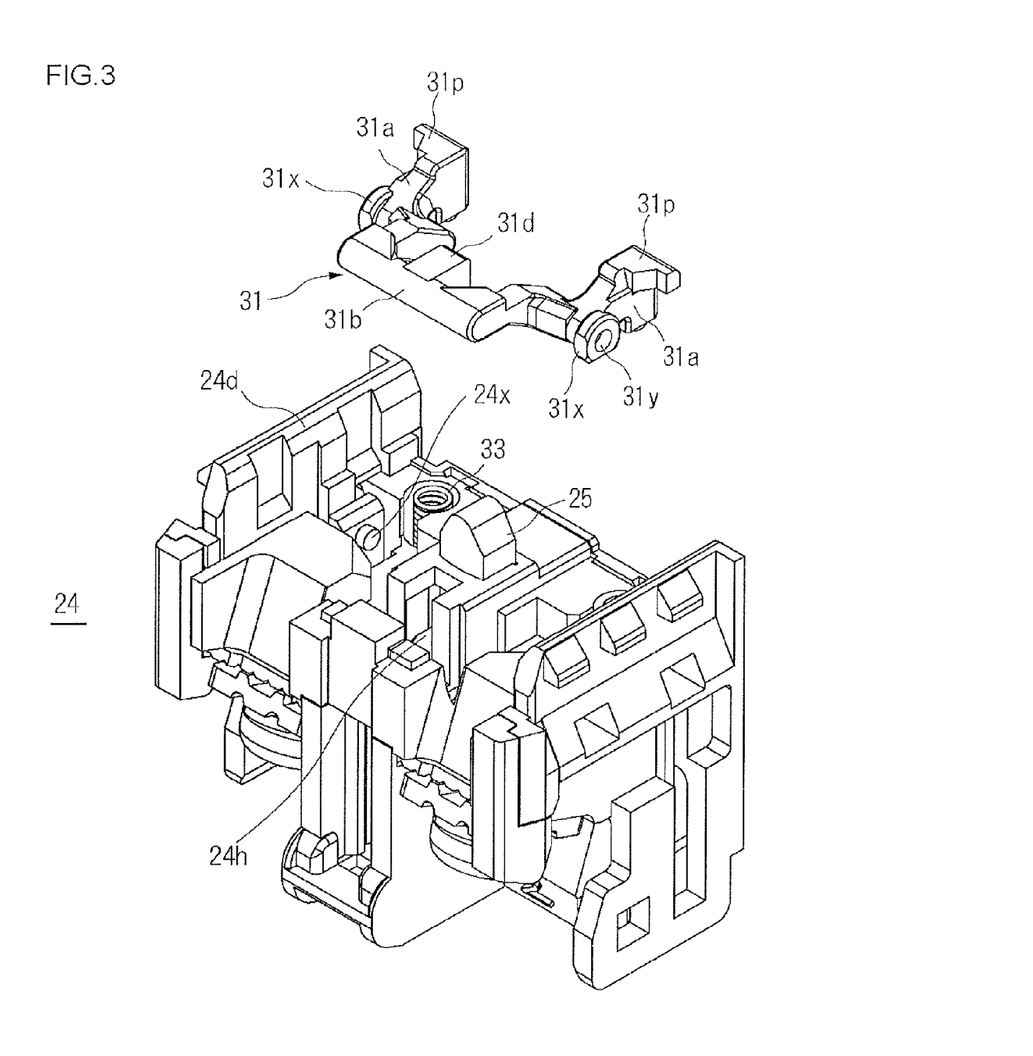
FIG. 3 is an exploded perspective view of a part of the open/close contact unit shown in FIG. 1.

FIGS. 1 to 3 show the embodiment in which the present invention is applied to an open/close contact unit of a push button switch.

An open/close contact unit 24, illustrated as an embodiment of the present invention, basically has substantially the same configuration as the conventional open/close contact unit described above. Therefore, the same reference numerals are applied to the corresponding parts.

The open/close contact unit 24 has a resin unit frame 24f that is configured to store therein an open/close contact mechanism 24c and a contact releasing mechanism 3. The open/close contact unit 24 can be provided with a normally open contact (a contact) configuration or a normally closed contact (b contact) configuration by selecting an open/close contact mechanism to be stored therein.

The open/close contact mechanism 24c has a case 24d in which is stored a lead terminal 24t pulled out of a fixed contact 22b, and a movable frame 25 that is supported to be capable of moving vertically. A side surface of the movable frame 25 is provided with a spring receiving piece 25c in a protruding manner, which receives a return spring force that acts upward when its lower end abuts with an upper end of a return spring 26 supported by the case 24d. As a result, the movable frame 25 is urged upward by the return spring 26. The movable frame 25 supports a movable contactor piece 27b having a movable contact 23b. The fixed contact 22b facing the movable contact 23b is disposed inside the case 24d, and both of these contacts configure an open/close contact pair. The open/close contact pair can be a pair of contacts having the normally closed contact (b contact) configuration or the normally open contact (a contact) configuration depending on the type of the movable contact.

The small rotary lever 31 of the contact releasing mechanism 3 is formed into a U-shape by a pair of rotary arms 31a disposed in parallel and a coupling arm 31b that couples tip ends of the rotary arms 31a to each other. A cylindrical bearing 31x having therein a circular bearing hole 31y is formed in a protruding manner in a middle part of each rotary arm 31a in accordance with the present invention, and a middle part of the coupling arm 31b is provided with a pressing piece 31d protruding downward. The rotary lever 31 with such a configuration is rotatably supported by the case 24d by inserting a columnar support shaft 24x into the bearing hole 31y of the outwardly protruding cylindrical bearing 31x, the support shaft 24x being formed in a protruding manner on a side surface of the resin case 24d functioning as the base member of the open/close contact mechanism 24c.

A releasing spring 33 configured by a compression coil spring is interposed between a lower surface of each of the rotary arms 31a of the rotatably supported rotary lever 31 and the case 24d. The pressing piece 31d of the lever 31 is inserted into a groove 24h through which the spring receiving piece 25c of the movable frame 25 of the open/close contact mechanism 24c is guided. Therefore, the pressing piece 31d can contact with and separate from the spring receiving piece 25c as the lever 31 turns.

The open/close contact mechanism 24c incorporated with the contact releasing mechanism 3 configures the open/close contact unit 24 shown in FIG. 3 by fitting and mounting a projected line 24p for fitting to a fitting groove 24q of the unit frame 24f and mounting the projected line 24p onto the frame 24f. FIG. 3 shows a state in which the rotary lever 31 is removed from the case 24d.

The switch part 2 is configured by incorporating the open/close contact unit 24, configured as described above, in a switch part case 21 as an open/close contact unit 24a having the normally open contact configuration or an open/close contact unit 24b having the normally closed contact configuration, and a push button switch is completed by coupling and joining this switch part 2 and the operating part 1 to each other.

The releasing spring 33 of the contact releasing mechanism 3 incorporated in the open/close contact unit 24 has one end thereof fixed to the case 24d of the open/close contact mechanism and the other end abuts with the rotary arm 31a of the rotary lever 31. Therefore, the rotary lever 31 constantly receives a counterclockwise rotary urging force from the releasing spring 33.

In the open/close contact unit 24, however, when the switch part 2 is coupled to the operating part 1 having a push button 12, a lower end of a body 11*a* at a tip end of a case 11 of the operating part 1 that is inserted into the switch part 2 (see FIG. 6) comes into abutment with an upper end part 31*p* of a base end of the rotary lever 31 (on the non-coupled arm side), and the lower end is slightly pressed down against the urging force of the releasing spring 33. For this reason, in a state in which the switch part 2 is joined to the operating part 1, the rotary lever 31 is turned clockwise with respect to the support shaft 24*x* of the case 24*d*. As a result, the pressing piece 31*d* on the tip end side (on the coupling arm 31*b* side) of the rotary lever 31 moves upward and separates from the spring receiving piece 25*c* of the movable frame 25 of the open/close contact mechanism, and the urging force of the releasing spring 33 applied to the movable frame 25 is canceled.

Thus, in the complete state in which the switch part is coupled with/connected to the operating part 1, the movable contact 23*b* of the open/close contact mechanism of the open/close contact unit 24 having the normally closed contact (b contact) configuration establishes a closure along with the fixed contact 22*b*, establishing an ON state.

When the push button 12 is pressed to accomplish an operating state, the movable frame 25 of the open/close contact unit 24 is pressed downward by a push stick that operates simultaneously with the operation of pushing the push button 12, and the open/close contact unit 24 having the normally closed contact (b contact) configuration releases the movable contact 23*b* from the fixed contact 22*b*, accomplishing an OFF state.

In the state in which the switch part 2 is completely joined to the operating part 1, in the rotary lever 31 of the contact releasing mechanism 3, the urging force of the releasing spring 33 is received by a base end-side end part of the rotary lever 31 that is connected to the body 11*a* of the operating part 1. Therefore, the urging force of the releasing spring 33 is not transmitted from the pressing piece 31*d* on the tip end side of the rotary lever 31 to the movable frame 25 of the open/close contact mechanism. For this reason, an opening/closing operation by pressing the push button 12 in such a state is not affected by the spring force of the releasing spring 33 of the contact releasing mechanism 3 and therefore can be executed smoothly.

Next described is a situation in which the operating part 1 and the switch part 2 that are joined to each other are removed from each other for some reasons and the switch part 2 falls off of the operating part 1 in the push button switch, resulting in an incomplete joined state between the operating part 1 and the switch part 2.

When the switch part 2 is removed from the operating part, a tip end of the body 11 of the operating part 1 in contact with and pressing the base end-side end part of the rotary lever 31 separates therefrom. As a result, the control of the rotary lever 31 on the base end-side end part 31*p* is removed, resulting in a free state of the rotary lever 31.

The state of the open/close contact unit 24 having the normally closed contact (b contact) configuration in this free state is shown in FIG. 1.

As is clear from the diagram, when the switch part 2 is removed from the operating part 1, the tip end of the body 11 of the operating part 1 separates from the base end-side end part of the rotary lever 31. Thus, freed rotary lever 31 is turned counterclockwise by the urging force of the releasing spring 33. The pressing piece 31*d* located at the tip end-side end part is moved downward by the rotary motion of the rotary lever 31 and abuts with the spring receiving piece 25*c* of the movable frame 25 of the open/close contact mechanism 24*c* to press the spring receiving piece 25*c* down. Consequently, the movable frame 25 descends against the return spring 26, and at the same time the movable contactor piece 27*b* supporting the movable contact descends. As a result, in case of the open/close contact unit 24*b* having the normally closed contact (b contact) configuration, the movable contact 23*b* separates from the fixed contact 22*b*, accomplishing the OFF state (see FIG. 1, FIG. 6).

In a case where this push button switch, which is configured especially by joining the switch part incorporating the open/close contact unit having the normally closed contact (b contact) configuration to the operating part, is used as a push button switch S for stopping the equipment in an emergency, when the switch part 2 is removed and falls off from the operating part 1 (joint failure) while the push button is pressed to send an emergency stop instruction by turning off the contacts, the contact releasing mechanism 3 can forcibly release the movable contact from the fixed contact to accomplish the OFF state, the movable contact being returned to a closure state. This can prevent the risk of canceling the emergency stop instruction.

As described above, the small rotary lever 31 of the contact releasing mechanism 3, which is incorporated in the open/close contact unit of the switch part attached to and detached from the operating part of the push button, is turned every time when the operating part is attached to or detached from the switch part. Thus, long-term use of the rotary lever 31 causes wear due to friction between the cylindrical bearing of the resin rotary lever 31 and the case-side support shaft supporting the cylindrical bearing, creating a phenomenon in which the rotary motion of the rotary lever 31 becomes rough and unstable.

According to the present invention, however, the turning-side rotary lever is provided with the cylindrical bearing and the fixed-side case is provided with the columnar support shaft that is fitted and inserted into the bearing hole of the cylindrical bearing. Therefore, an increase in the friction coefficient between the bearing and the support shaft can be kept small and a stable rotary motion of the rotary lever can be realized, even in the long-term use thereof.

This can expect that, although the turning-side rotary lever 31 constantly bears a load due to the presence of the releasing spring 33, the outer diameter of the bearing can be made large by shaping the bearing into a cylinder and providing the bearing hole in its center, increasing the mechanical rigidity of the bearing. In addition, the bearing is less deformed by external force, causing less wearing between the bearing and the support shaft and preventing the increase of the friction coefficient.

Moreover, according to this theory, in a configuration in which the rotary lever 31 is integrally formed with the cylindrical bearing 31*x* by means of a highly rigid resin such as polyphenylenesulfide (PPS) and in which the case 24*d* of the open/close contact mechanism supporting the bearing is integrally formed with the support shaft 24*x* by means of a highly elastic resin such as polyamide (PA), the increase in the friction coefficient of the bearing mechanism of the rotary lever 31 can be prevented, even in the long-term use of the rotary lever 31. This fact was confirmed by the following friction test.

Figure 4:
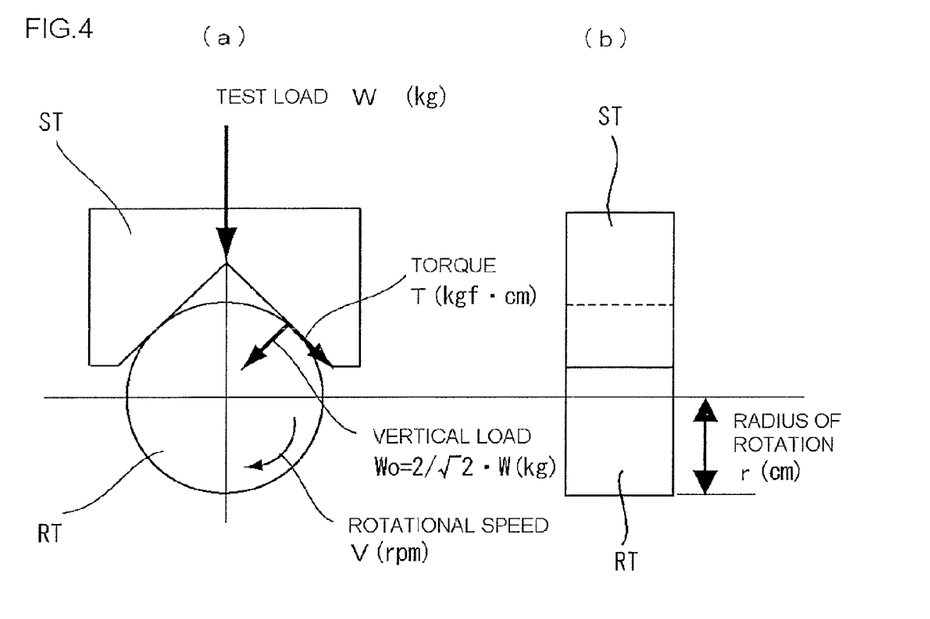
FIG. 4 is an explanatory diagram of a friction test performed on a bearing mechanism of a rotary member of the present invention.

The friction test was carried out in accordance with the ASTM (American Society for Testing and Materials) D2625-94 by combining a movable test piece RT and a fixed test piece ST, as shown in FIG. 4.

This friction test was executed by using the cylindrical bearing 31x provided in the rotary lever 31 of the present invention to resemble the fixed test piece ST shown in FIG. 4 and using the columnar support shaft 24x provided in the case 24d of the contact open/close mechanism to resemble the rotating test piece RT.

The fixed test piece ST was configured by a rectangular block of 25 mm in width, 15 mm in height, and 10 mm in thickness and having a 90° V-shaped groove in the middle. The rotating test piece RT is configured by a circular block of 18 mm in diameter and 10 mm in thickness.

In this friction test, the rotating test piece RT configured by the circular block is inserted into the V-shaped groove of the fixed test piece ST, and an outer circumferential surface of the rotating test piece RT is brought into abutment with an inner wall surface of the V-shaped groove of the fixed test piece ST, as shown in FIG. 4. A test load of 3 kg was applied from the fixed test piece ST to the rotating test piece RT, and the rotating test piece RT was rotated up to 1000 times at 60 rpm. A torque T was measured every 20 rotations, and a friction coefficient μ between the test pieces ST and RT was calculated based on the following formula (1).

In other words, the friction coefficient μ can be obtained as follows:

$$\mu = T/(W_o \times r) = \sqrt{2}/2 \times T/(W \times r) \quad (1)$$

where W represents the load applied from the fixed test piece ST to the movable test piece RT, T the torque acting between the test pieces ST and RT, and r a radius of rotation of the movable test piece RT.

However, a vertical load Wo acting from the fixed test piece ST onto the movable test piece RT is in the following relationship because the angle of the V-shaped groove of the fixed test piece ST is 90°.

$$W_o = 2/\sqrt{2} \times W \quad (2)$$

As an embodiment of the present invention, the friction test described above was carried out on a test piece that was obtained by configuring the fixed test piece ST with a highly rigid PPS resin and the rotating test piece RT with a highly elastic PA resin.

As a comparative example to be compared with the embodiment of the present invention, the same friction test was carried out on a test piece that was obtained by configuring the fixed test piece ST with a highly elastic PA resin and the rotating test piece RT with a highly rigid PPS resin.

Figure 5:
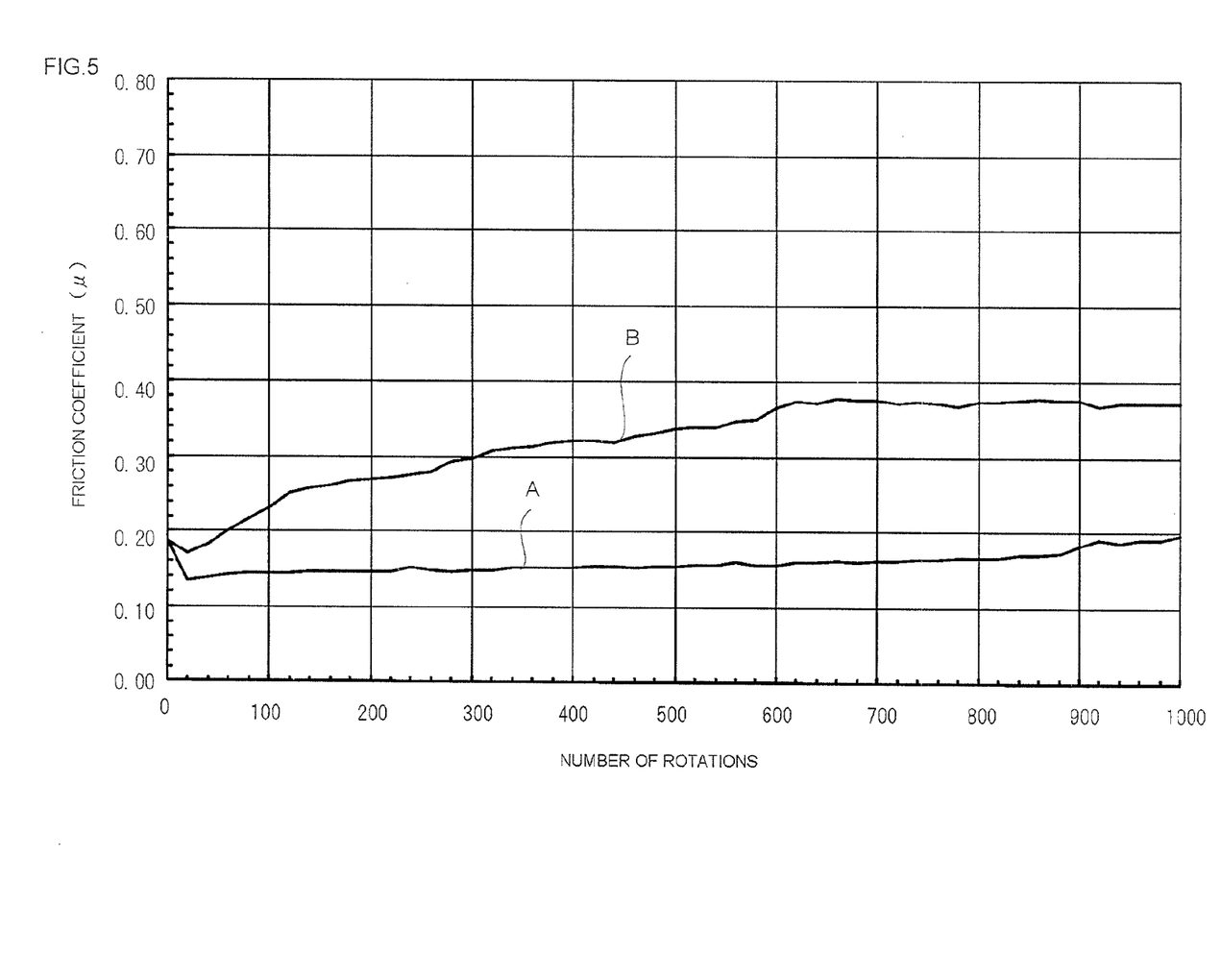
FIG. 5 is a graph showing frictional characteristics of the bearing mechanism of the rotary member of the present invention.

The results of the friction tests of the example and the comparative example of the present invention are compared and shown in FIG. 5.

FIG. 5 shows the frictional characteristics, wherein the vertical axis shows the friction coefficient (1) and the horizontal axis shows the number of rotations (times) of the test pieces. While a characteristic line A shown in FIG. 5 represents the frictional characteristics of the embodiment of the present invention, a characteristic line B represents the frictional characteristics of the comparative example.

As shown in FIG. 5, both the embodiment and the comparative example show a friction coefficient of approximately 0.18 in one rotation. However, the attachment between the fixed test piece and the rotating test piece became smooth after 20 rotations in both the embodiment and the comparative example. Consequently, the friction coefficient in each example has become lower than an initial value and reached the minimum friction coefficient.

Subsequently, in the comparative example, the friction coefficient increases in proportion to the increase in the number of rotations, as shown by the characteristic line B. In the embodiment of the present invention, on the other hand, the friction coefficient rarely increased up to 1000 rotations and was kept substantially constant regardless of the number of rotations, as shown by the characteristic line A. This indicates that the bearing mechanism of the rotary member according to the present invention can maintain its stable rotary motion without causing an increase in the friction coefficient, even in the long-term use of the rotary member.

EXPLANATION OF REFERENCE NUMERALS

24: Open/close contact mechanism
24d: Case of open/close contact mechanism (base member)
24x: Columnar support shaft
31: Rotary lever (rotary member)
31x: Cylindrical bearing
31y: Bearing hole

What is claimed is:

1. A bearing mechanism, comprising:
a rotary member made of a resin, and including a coupling arm, a pair of rotary arms each extending parallel from each end of the coupling arm, a pair of cylindrical bearings each integrally formed with and protruding outwardly from a side surface of each of the pair of rotary arms, and a bearing hole formed in each of the cylindrical bearings;
a base member made of a resin and rotatably supporting the rotary member, the base member having a pair of support shafts each having a columnar shape protruding inwardly from an inner side surface of the base member and entering the bearing hole of the cylindrical bearing to rotatably support the rotary member; and
an urging member constantly urging the rotary member in a predetermined direction.

2. The bearing mechanism according to claim 1, wherein the rotary member is made of a highly rigid resin and the base member is made of a highly elastic resin.

3. The bearing mechanism according to claim 2, wherein the rotary member is formed of a polyphenylenesulfide resin as the highly rigid resin and the base member is formed of a polyamide resin as the highly elastic resin.

4. The bearing mechanism according to claim 1, wherein each of the pair of support shafts is disposed in each of the bearing holes without penetrating therethrough.

5. The bearing mechanism according to claim 4, wherein the urging member is a compression coil spring interposed between a lower surface of each of the rotary arms of the rotary member and the base member, to generate a rotational force to the rotary member.

* * * * *

UNITED STATES PATENT AND TRADEMARK OFFICE
CERTIFICATE OF CORRECTION

PATENT NO.         : 8,853,579 B2
APPLICATION NO.    : 13/978473
DATED              : October 7, 2014
INVENTOR(S)        : Eijiro Shimoyama et al.

It is certified that error appears in the above-identified patent and that said Letters Patent is hereby corrected as shown below:

In SPECIFICATION,
Please change column 5, line 20, "the switch part is" to --the switch part 2 is--.

Please change column 7, line 51, "the friction coefficient (1)" to --the friction coefficient ($\mu$)--.

Signed and Sealed this
Twenty-eighth Day of April, 2015

Michelle K. Lee
*Director of the United States Patent and Trademark Office*